United States Patent
Korenblit et al.

(10) Patent No.: US 7,440,178 B2
(45) Date of Patent: Oct. 21, 2008

(54) TUNABLE GENERATION OF TERAHERTZ RADIATION

(75) Inventors: Yehiel Korenblit, Netanya (IL); Boris G. Tankhilevich, Walnut Creek, CA (US)

(73) Assignee: Terahertz Technologies, LLC, Walnut Creek, CA (US)

( * ) Notice: Subject to any disclaimer, the term of this patent is extended or adjusted under 35 U.S.C. 154(b) by 274 days.

(21) Appl. No.: 11/496,889

(22) Filed: Jul. 31, 2006

(65) Prior Publication Data
US 2008/0002250 A1   Jan. 3, 2008

Related U.S. Application Data

(63) Continuation-in-part of application No. 11/481,197, filed on Jul. 3, 2006.

(51) Int. Cl.
*H04B 10/17* (2006.01)
*H01S 4/00* (2006.01)

(52) U.S. Cl. .................. 359/342; 372/37; 372/43.01

(58) Field of Classification Search ............... 359/342; 372/37, 43.01
See application file for complete search history.

(56) References Cited

OTHER PUBLICATIONS

R.P. Van Stapele, "Sulphospinels", Ferromagnetic Materials, 1982, Chapter 8, vol. 3, North-Holland Publishing Company.
L. Passell, O. W. Dietrich and J. Als-Nielsen, "Neutron Scattering From The Heisenberg Ferromagnets EuO and EuS. I. The Exchange Interactions", Physical Review B, Dec. 1, 1976, pp. 4897-4907, vol. 14.
J.P. Lascaray, J.P. Desfours and M. Averous, "Bound Magnetic Polaron Evidence In EuO", Solid State Communications, 1976, pp. 677-679, vol. 19, Pergamon Press.
J. Schoenes and P. Wachter, "Exchange Optics In Gd-doped EuO", Physical Review B, Apr. 1, 1974, pp. 3097-3105, vol. 9, No. 7.

*Primary Examiner*—Eric Bolda
(74) *Attorney, Agent, or Firm*—Boris G. Tankhilevich

(57) ABSTRACT

A method of tunable generation of terahertz radiation comprising: (A) providing a magnon gain medium; wherein the magnon gain medium supports generation of nonequilibrium magnons; (B) generating terahertz radiation in the magnon gain medium; and (C) tuning frequency of the terahertz radiation by causing changes in an external parameter. The substantial tuning of the frequency of the generated terahertz radiation can be achieved by applying an external magnetic field, and by causing changes in a value of the external magnetic field.

20 Claims, 2 Drawing Sheets

TUNABLE GENERATION OF TERAHERTZ RADIATION

This patent application is a continuation-in-part (C-I-P) of the U.S. patent application Ser. No. 11/481,197, entitled "GENERATION OF TERAHERTZ WAVES", and filed on Jul. 3, 2006.

TECHNICAL FIELD

The current invention relates to generation of Terahertz waves.

BACKGROUND ART

In the U.S. patent application "GENERATION OF TERAHERTZ WAVES" generation of the Terahertz (THz) radiation was disclosed. The U.S. patent application "GENERATION OF TERAHERTZ WAVES" is incorporated herein its entirety and will be referred to hereafter as the patent application #1. However, the tunability of generated THz waves was not discussed.

DISCLOSURE OF THE INVENTION

The present invention provides a method and an apparatus for tunable generation of THz photons.

One aspect of the present invention is directed to a method for tunable generation of terahertz radiation.

In one embodiment, the method of the present invention comprises: (A) providing a magnon gain medium; wherein the magnon gain medium supports generation of nonequilibrium magnons; (B) generating terahertz radiation in the magnon gain medium; and (C) tuning frequency of the terahertz radiation by causing changes in an external parameter.

In one embodiment of the present invention, the step (A) further comprises: (A1) placing the magnon gain medium in a thermostat to maintain temperature of the magnon gain medium below a critical temperature.

In one embodiment of the present invention, the step (A) further comprises: (A2) selecting the magnon gain medium from the group consisting of: {ferromagnetic semiconductor; ferromagnetic isolator; and ferromagnetic material}. In one embodiment of the present invention, the step (A2) further comprises: (A2, 1) placing the magnon gain medium comprising the selected ferromagnetic material in the thermostat to maintain temperature of the selected ferromagnetic material below its Curie temperature.

In one embodiment of the present invention, the step (B) further comprises: (B1) injecting nonequilibrium electrons into the magnon gain medium; wherein propagation of the nonequilibrium electrons in the magnon gain medium causes generation of the nonequilibrium magnons; and wherein interaction between the nonequilibrium magnons causes generation of the terahertz radiation. In one embodiment of the present invention, the step (B1) further comprises: (B1, 1) pumping nonequilibrium electrons into the magnon gain medium. In another embodiment of the present invention, the step (B1) further comprises: (B1, 2) pumping polarized nonequilibrium electrons into the magnon gain medium. In one more embodiment of the present invention, the step (B1) further comprises: (B1, 3) pumping substantially sufficient number of polarized nonequilibrium electrons into the magnon gain medium, wherein the substantially sufficient number of pumped polarized nonequilibrium electrons causes generation of nonequilibrium magnons in the magnon gain medium. Yet, in another embodiment of the present invention, the step (B1) further comprises: (B1, 4) pumping a threshold number of polarized nonequilibrium electrons into the magnon gain medium, wherein the threshold number of pumped polarized nonequilibrium electrons is substantially sufficient to generate a magnon avalanche effect in the magnon gain medium.

In one embodiment of the present invention, the step (C) of tuning the frequency of the terahertz radiation by causing changes in the external parameter further comprises: (C1) applying an external magnetic field; and (C2) causing changes in a value of the external magnetic field. In this embodiment of the present invention, the frequency of the generated terahertz radiation changes due to dependence of energy of the nonequilibrium magnons on the value of external magnetic field.

In another embodiment of the present invention, the step (C) of tuning the frequency of the terahertz radiation by causing changes in the external parameter further comprises: (C3) applying an external hydrostatic pressure; and (C4) causing changes in a value of the external hydrostatic pressure. In this embodiment of the present invention, the frequency of the generated terahertz radiation changes due to dependence of stiffness of the nonequilibrium magnons on the value of external hydrostatic pressure.

In one more embodiment of the present invention, the step (C) of tuning the frequency of the terahertz radiation by causing changes in the external parameter further comprises: (C5) applying an external electric field; and (C6) causing changes in a value of the external electric field. In this embodiment of the present invention, the frequency of the generated terahertz radiation changes due to dependence of stiffness of the nonequilibrium magnons on the value of external electric field.

Another aspect of the present invention is directed to an apparatus for tunable generation of terahertz radiation.

In one embodiment, the apparatus of the present invention comprises: (A) a magnon gain medium; wherein the magnon gain medium supports generation of nonequilibrium magnons; (B) a means for generating terahertz radiation in the magnon gain medium; and (C) a means for tuning frequency of the generated terahertz radiation.

In one embodiment, the apparatus of the present invention further comprises: (D) a thermostat. In this embodiment of the present invention, the magnon gain medium is placed in the thermostat, and the thermostat is configured to maintain temperature of the magnon gain medium below a critical temperature.

In one embodiment of the present invention, the means (B) further comprises: (B1) a means for injecting nonequilibrium electrons into the magnon gain medium; wherein propagation of the nonequilibrium electrons in the magnon gain medium causes generation of the nonequilibrium magnons; and wherein interaction between the nonequilibrium magnons causes generation of the terahertz radiation.

In one embodiment of the present invention, the means (B1) further comprises: (B1, 1) a means for pumping nonequilibrium electrons into the magnon gain medium. In another embodiment of the present invention, the means (B1) further comprises: (B1, 2) a means for pumping polarized nonequilibrium electrons into the magnon gain medium.

In one embodiment of the present invention, the means (C) for tuning frequency of the terahertz radiation further comprises: (C1) a means for applying an external magnetic field; and (C2) a means for causing changes in a value of the external magnetic field.

In another embodiment of the present invention, the means (C) for tuning frequency of the terahertz radiation further comprises: (C3) a means for applying an external hydrostatic pressure; and (C4) a means for causing changes in a value of the external hydrostatic pressure.

In one more embodiment of the present invention, the means (C) for tuning frequency of the terahertz radiation further comprises: (C5) a means for applying an external electric field; and (C6) a means for causing changes in a value of the external electric field.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference now will be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific-details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of particles and quasi-particles interactions, procedures, equations, blocks, diagrams, and other symbolic representations of physical processes. These descriptions and representations are the means used by those skilled in the art of physics of condensed matter to most effectively convey the substance of their work to others skilled in the art.

Figure 1:
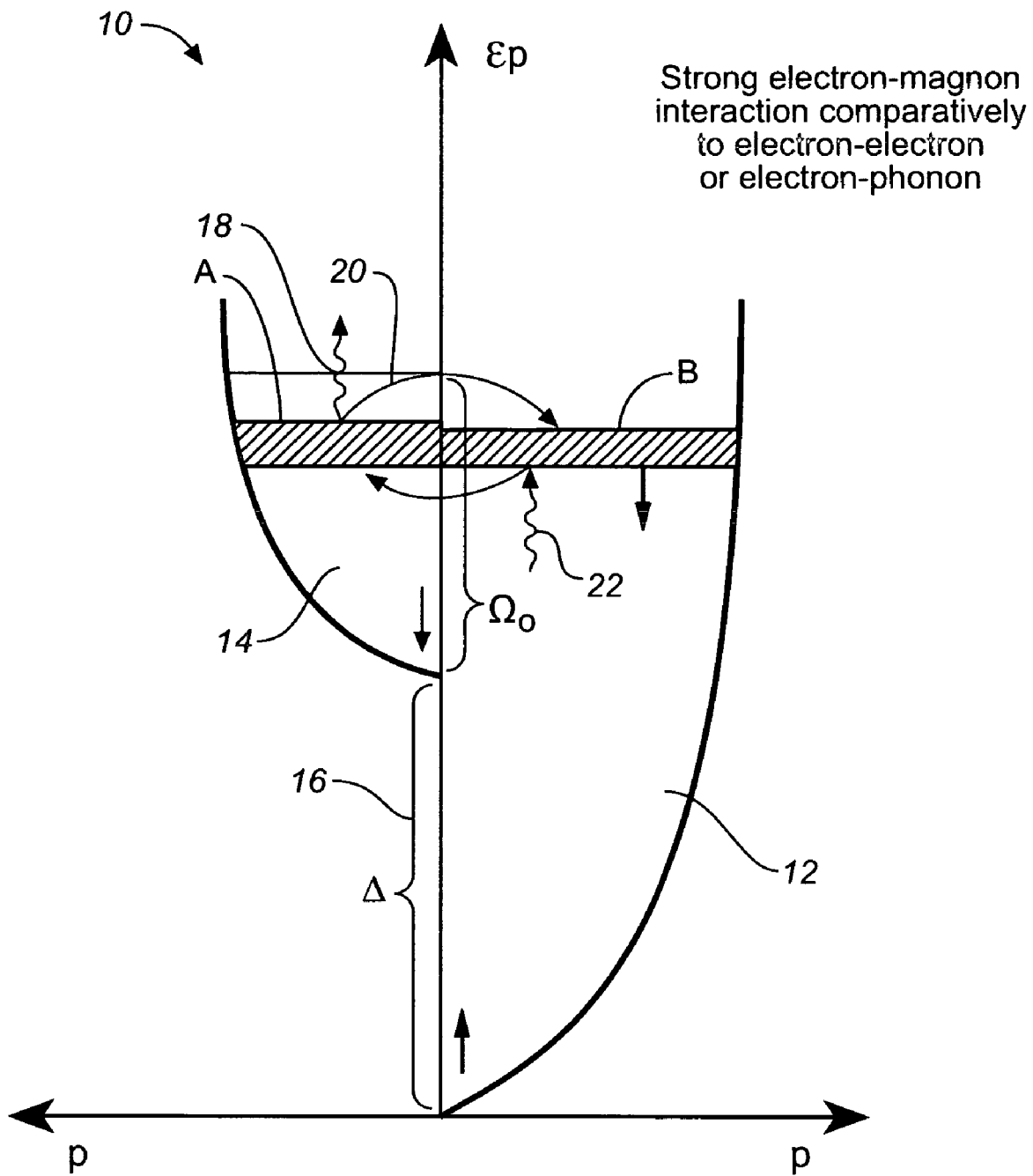
FIG. 1 illustrates process of strong electron-magnon interaction (comparatively with electron-electron or with electron-phonon interaction) wherein a nonequilibrium electron put in the upper subband with spin down rapidly emits a magnon with a large wave vector for the purposes of the present invention.

As it was disclosed in the patent application #1, as shown in FIG. 1, the electrons 20 interact with spin waves (magnons) 18. The energy of the magnons in the external magnetic field, H, is as follows:

$$\hbar\omega_q = (\hbar\omega_0 + Dq^2)^{1/2}(\hbar\omega_0 + \hbar\omega_M \sin_2\theta + Dq^2)^{1/2} \quad \text{(Eq. 1)}$$

Here q is the magnon wave-vector, D is the magnon stiffness, and θ is an angle between $\vec{q}$ and magnetic moment $\vec{M}$, $$\hbar\omega_0 = g\mu_B H, \quad \text{(Eq. 2)}$$

$$\hbar\omega_M = 4\pi g\mu_B M, \quad \text{(Eq. 3)}$$

where g is the g-factor (g≈2), and $\mu_B$ is the Bohr magneton.

Nonequilibrium electrons put into the upper subband with spin down (14 of FIG. 1) rapidly emit magnons, move to the subband with spin up (12 of FIG. 1), and then move to the bottom of this subband emitting optical phonons.

As it was disclosed in the patent application #1, the process of emitting magnons resembles the operation of the four-level laser system. More specifically, if one pumps (injects) substantially sufficient number of nonequilibrium electrons into the upper subband with spin down (14 of FIG. 1), the number of magnons in a narrow wave vector range starts increasing rapidly with pumping. Thus, this system operates as a "magnon laser".

It follows from the energy and momentum conservation laws that if the energy of nonequilibrium electrons, $\epsilon_p$, measured from the bottom of the spin down subband 14 is much smaller than the exchange gap $\Delta$ 16, the wave vectors q of the emitted magnons 18, lie in the interval $q_1 \leq q \leq q_2$, where $q_{1,2} = \hbar^{-1}(p_0 \pm p)$, $p_0 = (2m\Delta)^{1/2}$, $p = (2m\epsilon_p)^{1/2} << p_0$, m is the electron effective mass.

In the expressions for $q_{1,2}$ small corrections of order of $\hbar\omega_0/\Delta$ and of $\hbar\omega_M/\Delta$ were neglected. The gap $\Delta$ is of order of several hundreds of meV. Therefore, $q_0 = \hbar^{-1} p_0$ is large enough so that in (Eq. 1) the term $Dq^2$ is significantly greater than $\hbar\omega_0$ and is significantly greater than $\hbar\omega_M$. That is why we can neglect in what follows the weak dependence of $\hbar\omega_q$ on θ. In this case, (Eq. 1) can be rewritten as follows:

$$\hbar\omega_q = (\hbar\omega_0 + Dq^2) \quad \text{(Eq. 4)}$$

As it was disclosed in the patent application #1, merging of two magnons with wave vectors q and q' generates a photon with wave vector $$\vec{k} = \vec{q} + \vec{q}' \quad \text{(Eq. 5)}$$

and with frequency $v_k$ equal to $$\omega_q + \omega_{q'} = v_k = ck, \quad \text{(Eq. 6)}$$

where c is the light velocity.

It follows from these conservation laws that k is much smaller than q, i.e.

$$\vec{q} = -\vec{q}'; \omega_q = \omega_{q'}. \quad \text{(Eq. 7)}$$

Thus, the frequency of the generated radiation is as follows:

$$f_r = v_k/2\pi = (\omega_0 + \hbar^{-1} Dq^2)/\pi \quad \text{(Eq. 8)}$$

Let us introduce the new parameter, namely the magnetic field-induced tunability:

$$t_H = \partial f_r/\partial H \quad \text{(Eq. 9)}$$

It follows from (Eqs. 8 and 9) that $t_H$ is as follows:

$$t_H = g\mu_B/\pi\hbar = 0.056 \text{ THz/T}. \quad \text{(Eq. 10)}$$

Figure 2:
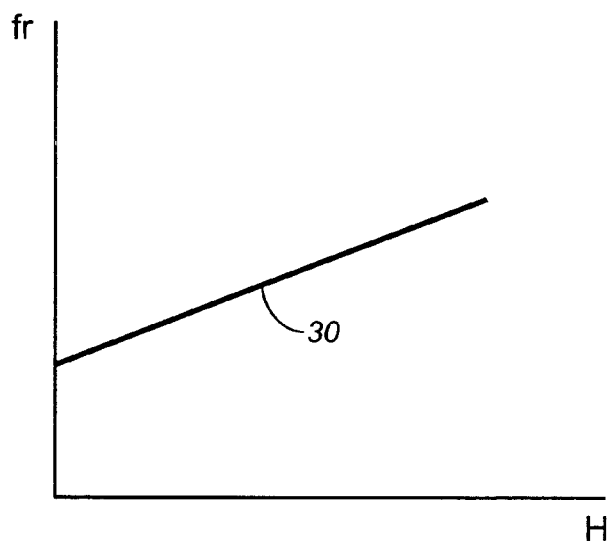
FIG. 2 shows the dependence of the energy of emitted photons on magnetic field in case of positive tunability for the purposes of the present invention.

Thus, the field H=1 T tunes the radiation frequency of 1 THz by approximately 6%. The dependence of the frequency of the generated radiation $f_r$ on magnetic field H 30 is shown in FIG. 2.

As an example, let us consider the THz radiation in the ferromagnetic semiconductor EuO, with the Curie temperature $T_c=70$ K. For EuO, with $m=0.35\ m_0$, whereas $m_0$ is the free electron mass, (J. Shoenes and P. Wachter, Phys. Rev. B 9, 3097 (1974)), and with the gap $\Delta=0.6$ eV (J. Lascaray, J. P. Desfours, and M. Averous, Sol. St. Com. 19, 677 (1976)), the wave vector of the excited magnons $q \approx q_0 = \hbar^{-1} p_0 = 2.6\ 10^7$ cm$^{-1}$. The spin-wave stiffness $D=10.8\ 10^{-16}$ mev·cm$^2$. (L. Passel, O. W. Dietrich and J. Als-Nielsen, Phys. Rev. B 14, 4897, 1976). This gives the energy of the excited magnons at zero magnetic fields: $\hbar\omega|_{H=0}=Dq^2=0.73$ meV, and the frequency $f_m=\omega/2\pi \approx 0.176$ THz. Thus, in the given-above example, the frequency of the generated radiation is: $f_r|_{H=0}=2f_m=0.352$ THz.

In the field H=1 T (Tesla), the frequency of the generated radiation according to (Eq. 8) is equal to: $f_r|_{H=1T}=0.408$ THz. Thus the relative change in the frequency of the generated radiation is: $[f_r(H=1\ T)-f_r(H=0)]/f_r(H=0)=16\%$.

Let us also introduce three more parameters. The hydrostatic pressure-induced tunability:

$$t_P = \partial f_r / \partial P, \qquad (\text{Eq. 11})$$

the carrier concentration-induced tunability:

$$t_c = \partial f_r / \partial n_c, \qquad (\text{Eq. 12})$$

and the electric field-induced tunability:

$$t_E = \partial f_r / \partial E. \qquad (\text{Eq. 13})$$

Figure 3:
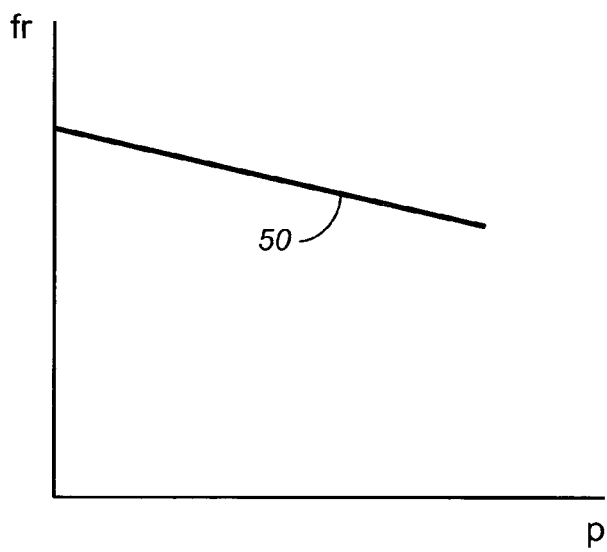
FIG. 3 illustrates the dependence of the energy of emitted photons on the hydrostatic pressure in case of negative tunability for the purposes of the present invention.

The hydrostatic pressure-induced tunability $t_P$ is determined by the dependence of the stiffness D on hydrostatic pressure P. For instance, in the ferromagnetic semiconductor CdCr$_2$Se$_4$, with $T_c=130$ K, $T_c$ decreases with the pressure: $\partial T_c/\partial P=(-)0.82$ K/kbar. Please, see R. P. Van Stapele, in "Ferromagnetic Materials", vol. 3, edited by E. P. Wolfarth, North-Holland Publishing Company, 1982. The change in $T_c$ is related to the dependence of the exchange integrals on the lattice constant. It is expected that the dependence of D on P is similar to the dependence of $T_c$ on P. Thus, the radiated frequency $f_r$ depends on P (50 of FIG. 3).

Figure 4:
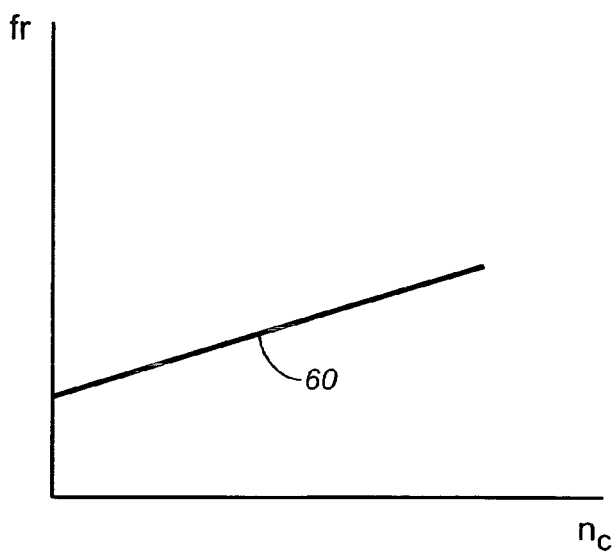
FIG. 4 depicts the dependence of the energy of emitted photons on the carrier concentration in case of positive tunability for the purposes of the present invention.

In a ferromagnetic semiconductor the stiffness D can also depend on the carrier concentration $n_c$ if the RKKY (Ruderman-Kittel-Kasuya-Yosida) indirect exchange contributes essentially to D. If this is the case, the carrier concentration-induced tunability $t_c$ (Eq. 12) is determined by the dependence of D on $n_c$. FIG. 4 depicts the dependence 60 of the frequency of the generated radiation $f_r$ on the carrier concentration $n_c$.

There are situations when the carrier concentration $n_c$ and, hence, the stiffness D, depends on the external electric field E. In these situations the generated frequency can be tuned by using the electric field according to (Eq. 13).

In one embodiment, the method of the present invention for tunable generation of terahertz radiation comprises (not shown): (A) providing a magnon gain medium; wherein the magnon gain medium supports generation of nonequilibrium magnons; (B) generating terahertz radiation in the magnon gain medium; and (C) tuning frequency of the terahertz radiation by causing changes in an external parameter.

The first two steps (A) and (B) are fully disclosed in the patent application #1. So, we focus our attention on the step (C): tuning frequency of the terahertz radiation by causing changes in an external parameter.

In one embodiment of the present invention, the frequency of the generated terahertz radiation changes due to dependence of energy of the nonequilibrium magnons on the value of external magnetic field. Please, see (Eq. 9), and (Eq. 10). In this embodiment of the present invention, the step (C) of tuning the frequency of the terahertz radiation by causing changes in the external parameter further comprises (not shown): (C1) applying an external magnetic field to an apparatus of the present invention (as it is disclosed in the patent application #1), and (C2) causing changes in a value of the external magnetic field. The basic configuration of the apparatus of the present invention (as it s disclosed in the patent application #1) comprises: (A) a magnon gain medium (for example, a ferromagnetic semiconductor), (B) a source of nonequilibrium electrons; and (C) a thermostat configured to maintain temperature of the magnon gain medium below a critical temperature. It is well known to a person skillful in the art how to apply an external magnetic field and how to cause the changes in value of the applied external magnetic field.

In another embodiment of the present invention, the frequency of the generated terahertz radiation changes due to dependence of stiffness of the nonequilibrium magnons on the value of external hydrostatic pressure. Please, see (Eq. 11). In this embodiment of the present invention, the step (C) of tuning the frequency of the terahertz radiation by causing changes in the external parameter further comprises: (C3) applying an external hydrostatic pressure to the apparatus of the present invention (as it is disclosed in the patent application #1); and (C4) causing changes in a value of the external hydrostatic pressure. It is well known to a person skillful in the art how to apply an external hydrostatic pressure and how to cause the changes in value of the applied external hydrostatic pressure.

In one more embodiment of the present invention, the frequency of the generated terahertz radiation changes due to dependence of stiffness of the nonequilibrium magnons on the value of external electric field. Please, see (Eq. 13). In this embodiment of the present invention, the step (C) of tuning the frequency of the terahertz radiation by causing changes in the external parameter further comprises: (C5) applying an external electric field to the apparatus of the present invention (as it is disclosed in the patent application #1); and (C6) causing changes in a value of the external electric field. It is well known to a person skillful in the art how to apply an external electric field and how to cause the changes in value of the applied external electric field.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents

What is claimed is:

1. A method of tunable generation of terahertz radiation comprising:
   (A) providing a magnon gain medium; wherein said magnon gain medium supports generation of nonequilibrium magnons;
   (B) generating terahertz radiation in said magnon gain medium; and
   (C) tuning frequency of said terahertz radiation by causing changes in an external parameter.

2. The method of claim 1, wherein said step (A) further comprises:
   (A1) placing said magnon gain medium in a thermostat to maintain temperature of said magnon gain medium below a critical temperature.

3. The method of claim 1, wherein said step (A) further comprises:
(A2) selecting said magnon gain medium from the group consisting of: {ferromagnetic semiconductor; ferromagnetic isolator; and ferromagnetic material}.

4. The method of claim 3, wherein said step (A2) further comprises:
(A2,1) placing said magnon gain medium comprising said selected ferromagnetic material in said thermostat to maintain temperature of said selected ferromagnetic material below its Curie temperature.

5. The method of claim 1, wherein said step (B) of generating terahertz radiation in said magnon gain medium further comprises:
(B1) injecting nonequilibrium electrons into said magnon gain medium; wherein propagation of said nonequilibrium electrons in said magnon gain medium causes generation of said nonequilibrium magnons; and wherein interaction between said nonequilibrium magnons causes generation of said terahertz radiation.

6. The method of claim 5, wherein said step (B1) further comprises:
(B1, 1) pumping nonequilibrium electrons into said magnon gain medium.

7. The method of claim 5, wherein said step (B1) further comprises:
(B1, 2) pumping polarized nonequilibrium electrons into said magnon gain medium.

8. The method of claim 5, wherein said step (B1) further comprises:
(B1, 3) pumping substantially sufficient number of polarized nonequilibrium electrons into said magnon gain medium, wherein said substantially sufficient number of pumped polarized nonequilibrium electrons causes generation of nonequilibrium magnons in said magnon gain medium.

9. The method of claim 5, wherein said step (B1) further comprises:
(B1, 4) pumping a threshold number of polarized nonequilibrium electrons into said magnon gain medium, wherein said threshold number of pumped polarized nonequilibrium electrons is substantially sufficient to generate a magnon avalanche effect in said magnon gain medium.

10. The method of claim 1, wherein said step (C) of tuning said frequency of said terahertz radiation by causing changes in said external parameter further comprises:
(C1) applying an external magnetic field; and
(C2) causing changes in a value of said external magnetic field; wherein said frequency of said generated terahertz radiation changes due to dependence of energy of said nonequilibrium magnons on said value of external magnetic field.

11. The method of claim 1, wherein said step (C) of tuning said frequency of said terahertz radiation by causing changes in said external parameter further comprises:
(C3) applying an external hydrostatic pressure; and
(C4) causing changes in a value of said external hydrostatic pressure; wherein said frequency of said generated terahertz radiation changes due to dependence of stiffness of said nonequilibrium magnons on said value of external hydrostatic pressure.

12. The method of claim 1, wherein said step (C) of tuning said frequency of said terahertz radiation by causing changes in said external parameter further comprises:
(C5) applying an external electric field; and
(C6) causing changes in a value of said external electric field; wherein said frequency of said generated terahertz radiation changes due to dependence of stiffness of said nonequilibrium magnons on said value of external electric field.

13. An apparatus for tunable generation of terahertz radiation comprising:
(A) a magnon gain medium; wherein said magnon gain medium supports generation of nonequilibrium magnons;
(B) a means for generating terahertz radiation in said magnon gain medium; and
(C) a means for tuning frequency of said generated terahertz radiation.

14. The apparatus of claim 13 further comprising:
(D) a thermostat, wherein said magnon gain medium is placed in said thermostat, and wherein said thermostat is configured to maintain temperature of said magnon gain medium below a critical temperature.

15. The apparatus of claim 13, wherein said means (B) further comprises:
(B1) a means for injecting nonequilibrium electrons into said magnon gain medium; wherein propagation of said nonequilibrium electrons in said magnon gain medium causes generation of said nonequilibrium magnons; and wherein interaction between said nonequilibrium magnons causes generation of said terahertz radiation.

16. The apparatus of claim 15, wherein said means (B1) further comprises:
(B1, 1) a means for pumping nonequilibrium electrons into said magnon gain medium.

17. The apparatus of claim 15, wherein said means (B1) further comprises:
(B1, 2) a means for pumping polarized nonequilibrium electrons into said magnon gain medium.

18. The apparatus of claim 13, wherein said means (C) for tuning frequency of said terahertz radiation further comprises:
(C1) a means for applying an external magnetic field; and
(C2) a means for causing changes in a value of said external magnetic field.

19. The apparatus of claim 13, wherein said means (C) for tuning frequency of said terahertz radiation further comprises:
(C3) a means for applying an external hydrostatic pressure; and
(C4) a means for causing changes in a value of said external hydrostatic pressure.

20. The apparatus of claim 13, wherein said means (C) for tuning frequency of said terahertz radiation further comprises:
(C5) a means for applying an external electric field; and
(C6) a means for causing changes in a value of said external electric field.

* * * * *